April 14, 1942.　　　S. A. LYON　　　2,279,829
DEVICE FOR RAISING SUNKEN SUBMARINES
Filed Dec. 4, 1940　　　2 Sheets-Sheet 1

INVENTOR
Swayze A. Lyon.
BY Corbett, Mahoney & Miller
ATTORNEYS

April 14, 1942.                    S. A. LYON                    2,279,829
                    DEVICE FOR RAISING SUNKEN SUBMARINES
                    Filed Dec. 4, 1940            2 Sheets-Sheet 2

INVENTOR
Swayze A. Lyon.
BY Corbett, Mahoney & Miller
ATTORNEYS

Patented Apr. 14, 1942

2,279,829

UNITED STATES PATENT OFFICE 2,279,829

DEVICE FOR RAISING SUNKEN SUBMARINES

Swayze A. Lyon, Columbus, Ohio

Application December 4, 1940, Serial No. 368,519

2 Claims. (Cl. 114—16.4)

My invention relates to a device for raising sunken submarines. It has to do, more particularly, with a device which will indicate the location of a submarine after it sinks and which can be used in raising the submarine.

There have been a number of different devices suggested in the past for this purpose. However, none of these devices have been very satisfactory. With most of these devices, it is necessary for the rescue ship to have special equipment for cooperating with the device carried by the submarine in order to raise the submarine. This is a great disadvantage inasmuch as a properly equipped rescue ship may not be near the location where the submarine sinks. Furthermore, most of these prior art devices have been extremely complicated and expensive to install on a submarine. Prior art devices have been possessed of many other disadvantages.

One of the objects of my invention is to provide a device for indicating the location of and for use in raising sunken submarines and which is extremely simple and inexpensive to install on the submarine but which is very efficient for the purposes for which it is intended.

Another object of my invention is to provide a device of the type indicated for use in raising sunken submarines which is of such a nature that the rescue ship need not be provided with special equipment for cooperating therewith and, consequently, any nearby ship may be used in the rescue work.

Another object of my invention is to provide a device of the type indicated which is of such a nature that the initial movement of the submarine towards the surface will be greatly facilitated.

In its preferred form, my invention embodies an attachment which is adapted to be secured to the submarine at one end thereof. This attachment embodies a buoy which is normally seated on a suitable seat on the exterior of the submarine. Means is provided for maintaining the buoy on its seat under normal conditions but which can be operated from a point inside the submarine to release the buoy and allow it to rise to the surface. The buoy has attached thereto a small cable which will unwind as it rises to the surface and a larger cable which is attached to the submarine and the free end of which can be drawn to the surface by the smaller cable attached to the buoy. The larger cable is attached to the submarine at the front thereof. It passes through a special member into the interior of the submarine where it is anchored. This member is of such a nature that an additional cable may be attached thereto to be used in conjunction with the other cable for raising the submarine. This member is so disposed that the additional cable may be looped around the permanently attached cable and when lowered will be guided into position over a projection portion of such sleeve member.

This application is a continuation in part of my application, Serial No. 220,277, filed July 20, 1938, now abandoned.

The preferred embodiment of my invention is illustrated in the accompanying drawings wherein similar characters of reference designate corresponding parts and wherein.

Figure 1:
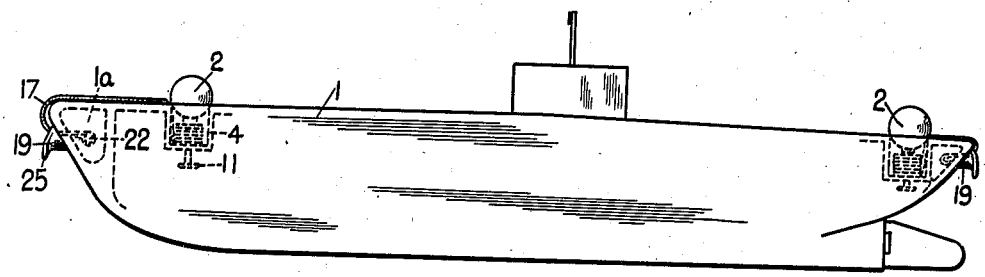
Figure 1 is a side elevation showing a submarine with my device applied thereto.

With reference to the drawings, in Figure 1, I have illustrated my invention attached to a submarine 1 of the usual type. One of my devices is shown attached to the submarine at each end thereof.

Figure 2:
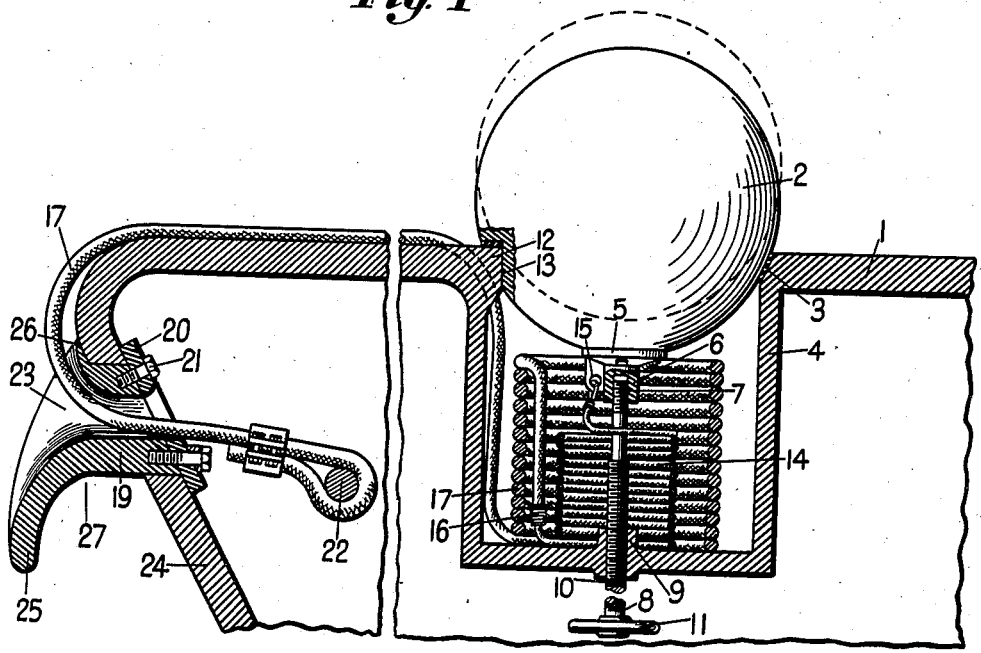
Figure 2 is an enlarged view mainly in section showing my device.
Figures 3, 4:
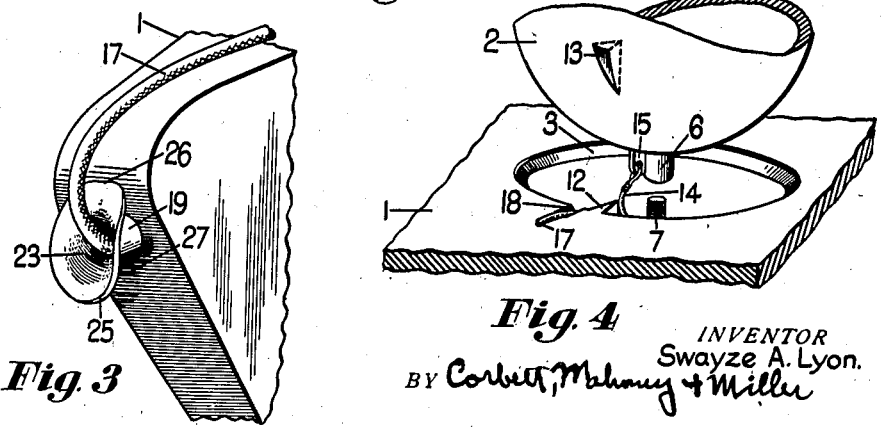
Figure 3 is a detail in perspective of the special member which I provide at the front of the submarine through which the large cable passes into the interior thereof.
Figure 4 is a perspective view of a portion of the device showing the buoy released and beginning to rise.

As illustrated best in Figures 2, 3 and 4, my device includes a buoy 2 in the form of a sphere which may be constructed of any suitable material and in any suitable manner. The buoy is of such a nature that it will float on water and will sustain the weight of a cable which is attached to it in a manner to be described.

The buoy 2 normally seats, as indicated in Figure 2, on an annular inclined seat 3 disposed at the upper end of a housing 4 of annular cross section. This housing 4 may be formed as an integral part of the hull of the submarine and projects into the submarine as indicated in Figures 1 and 2. Thus, a cylindrical housing 4 is provided which has its upper end opened and its lower end closed, the lower end being disposed within the submarine. The buoy 2 will normally rest on the seat 3 and the seat 3 is preferably made of rubber so that there will be a watertight seat at this point.

In order to maintain the buoy 2 on its seat during normal conditions, I provide a device which is accessible from the interior of the submarine and which may be operated to release the buoy when desired. Thus, in Figure 2 I have shown the lower surface of the buoy provided with an attachment 5 which may be riveted thereto or connected thereto in any suitable manner. This attachment 5 includes a downwardly projecting threaded socket 6 adapted to receive the upper threaded portion 7 of a screw 8. This screw passes through a centrally located boss 9 carried by the bottom wall of the housing 4. This boss has its interior threaded for cooperation with the threaded portion 10 of the screw 8. The screw 8 may be rotated by means of a hand wheel 11 which is disposed inside the submarine in a readily accessible position. The portion 7 is provided with a fast thread while the portion 10 is provided with a slow thread so that a slight turn of the hand wheel 11 will result in withdrawal of the upper end of the screw 8 from the socket 6 thereby quickly releasing the buoy. In order to prevent rotation of the buoy at the time it is being released by turning the screw 8, I provide an inwardly projecting lug 12 which cooperates with a slot 13 in the surface of the buoy 2 and prevents rotation of the buoy until it is released by the screw 8.

The buoy 2 has a small cable 14 attached thereto. The end of this cable is attached at 15 to the attachment 5 secured to the buoy. This cable is normally wound in a coil around the screw 8 which rests on the bottom of the housing 4, as indicated in Figure 2. The opposite end of the small cable is attached at 16 to one end of a large cable 17. This large cable 17 is also disposed within the housing 4 in the form of a coil surrounding the coil of smaller cable and resting on the bottom of the housing 4. This cable passes upwardly through a notch or slot 18 (Figure 4) beneath the buoy 2 and which is formed at the upper edge of the housing 4. The cable 17 passes towards the adjacent end of the submarine along the exterior surface of the hull.

The cable passes around the end of the submarine, downwardly and then in a reverse direction through a special sleeve 19. This sleeve is disposed in an opening formed in the hull of the submarine and is secured in position by means of a collar 20 disposed within the hull, which is secured to the inner end of the sleeve by means of bolts 21. The end of the cable is anchored to a transversely extending pin or rod 22, which is secured to the walls of the submarine in a suitable manner in a watertight compartment 1a of the end of the submarine. It will be noted that the sleeve 19 has a funnel-shaped outer end 23, as indicated best in Figure 3. This will prevent fouling of the cable. It will also be noted from Figure 2 that due to the rearwardly inclined wall 24 of the submarine, and to the special shape of the outer end of the sleeve 19, the upper portion of the flange 25 on the extreme outer end of the sleeve will contact with the outer surface of the wall 24, as at 26. This contact will occur at the top of the sleeve only. At the bottom and sides of the sleeve there will be a substantial space 27 between the flange 25 and the wall 24. This structure is provided so that an additional cable may be looped around the cable 17, lowered to a position adjacent the sleeve 19, and be guided around the projecting portion of the sleeve. If an upward pull is exerted on the additional cable, it will be firmly engaged with the projecting portion of the sleeve.

Figure 5:
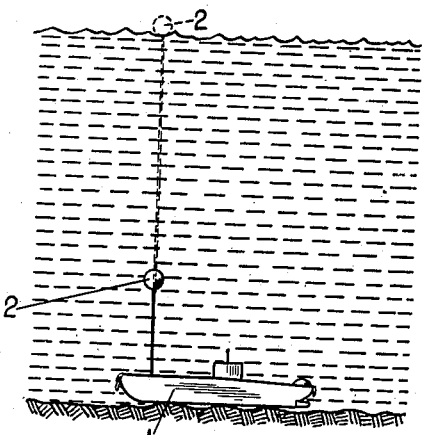
Figure 5 is a diagrammatic view showing how the buoy will rise to the surface after it is released, pulling the small cable therewith.
Figure 6:
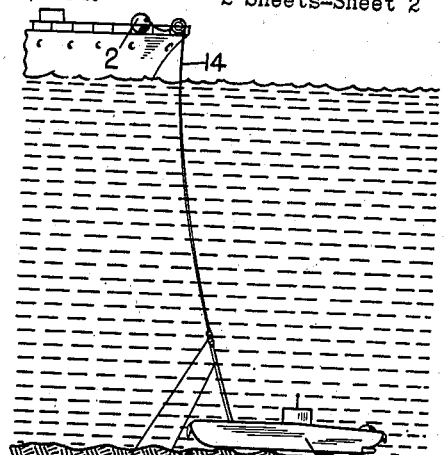
Figure 6 is a similar view illustrating how the small cable may be utilized to pull the larger cable to the surface.

It will be apparent that my device will normally be in the condition illustrated in Figure 2. In case the submarine sinks, my attachment may be used in the manner illustrated in Figures 5 to 9, inclusive. First, an occupant of the submarine will turn the hand wheel 11 which will release the buoy 2 in the manner previously indicated. The buoy will immediately rise to the surface unwinding the small cable 14 and pulling it upwardly therewith (Figure 5). The buoy will float on the surface and will indicate to a rescue ship the location of the sunken submarine. The small cable 14 may then be pulled upwardly in order to draw the large cable 17 upwardly to the surface (Figure 6). This cable may then be used in raising the submarine. However, in most cases, it will be advisable to use an additional heavy cable in raising the submarine. To attach this additional cable to the submarine, it is merely necessary to loop one end 28 of an additional cable 29 around the cable 17 (Figure 7) at the surface and then to lower this cable 29. The loop 28 will cooperate with the cable 17 in guiding the cable 29 until the loop will pass around the projecting portion of sleeve 19. Then, if the cable 29 is pulled upwardly slightly, it will pass into the space 27 beneath the sleeve, as indicated in Figure 10. There is no danger of the loop engaging the top part of the sleeve because of the contact of the end of the sleeve with the hull at 26. Then, as indicated in Figure 8, both the cable 17 and the cable 26 may be utilized in raising the submarine.

Figure 7:
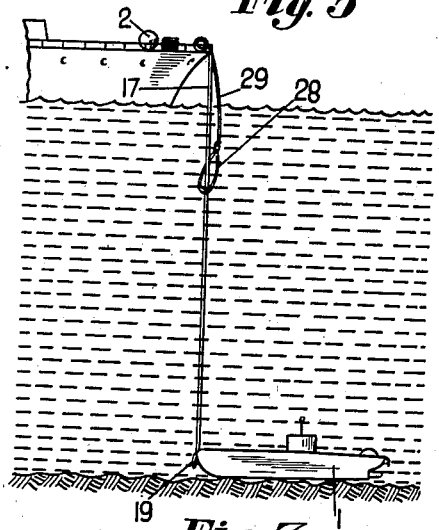
Figure 7 is a similar view illustrating how the permanently attached cable may be employed to guide an additional cable into position to be attached to the special sleeve member.
Figure 8:
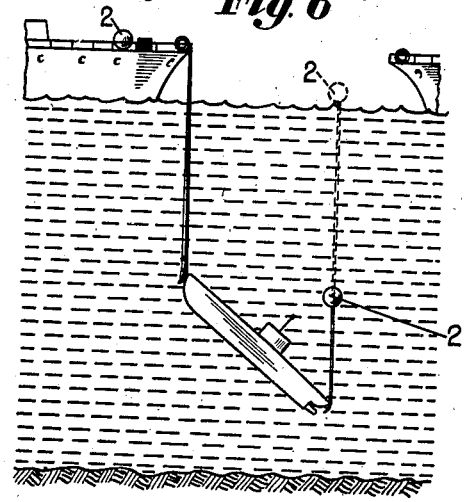
Figure 8 is a similar view showing how the cables may be used to start pulling the submarine towards the surface.
Figure 9:
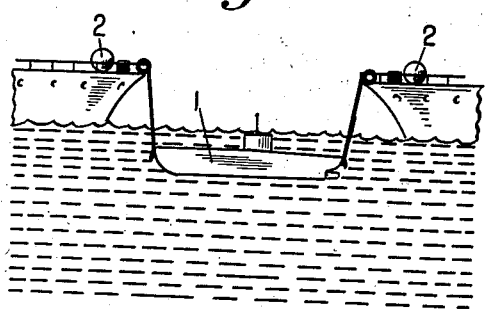
Figure 9 is a similar view showing cables attached to both ends of the submarine.
Figure 10:
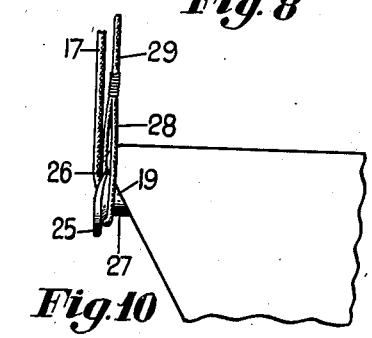
Figure 10 is a view showing the additional cable guided into position so that it fits around the projecting part of the sleeve member.

It is preferred to raise the submarine in the manner illustrated in Figures 7, 8 and 9. First, as indicated in Figure 8, the cables are used to raise one end of the submarine in order to get it started towards the surface. With the craft lying on the bottom, as indicated in Figure 7, it would be more difficult to lift both ends at once. Therefore, one end only is lifted to get it started towards the surface. After it is started, as indicated in Figure 8, the buoy at the other end of the craft is released and another surface ship may be employed, as indicated in Figure 9, for lifting the other end of the boat.

It will be apparent from the above description that I have provided a device having many advantages. By having the cable attached to the end of the submarine, starting of the craft towards the surface is facilitated. Furthermore, by having the end of the cable attached to the interior of the craft, a much stronger structure may be produced.

The device will be very effective for raising sunken submarines but still it is extremely simple and is inexpensive to install on a submarine. One of the important advantages of my device is due to the fact that my attachment is of such a nature that the rescue ship need not be provided with special equipment for cooperating therewith. Consequently, any nearby ship may be used in the rescue work.

Various other objects and advantages will be apparent from the preceding description, the drawings and the following claims.

Having thus described my invention, what I claim is:

1. A device for indicating the location of a sunken submarine and for use in raising the submarine comprising a housing disposed on the hull of the submarine adjacent one end thereof and projecting into the interior thereof, said housing having its upper end open and its lower end closed, said housing having a seat formed at its upper end, a buoy resting on said seat, means for normally maintaining said buoy on said seat, said means comprising a screw member passing through the bottom of said housing and being connected to said buoy by a threaded connection, said screw member being accessible from within the submarine in order to permit the release of the buoy when desired, interfitting portions on said buoy and adjacent said seat to prevent rotation of the buoy until released by said screw, a small cable normally disposed within said housing in surrounding relationship to said screw and having one end attached to said buoy, a notched passageway formed in the buoy seat beneath said buoy, a larger cable normally disposed in said housing having one end attached to said small cable and having its other end passed through said passageway formed in the buoy seat beneath said buoy and passed over the exterior of the hull of the submarine to the extreme end thereof, and opening in said extreme end of the hull, a passageway through said opening to the interior of the hull for the cable to pass through, the end of said cable being anchored to a transversely extending pin secured to the wall in the interior of the hull.

2. A device according to claim 1 wherein a sleeve is disposed in said opening in the wall of the submarine at said end, said sleeve having a projecting funnel-shaped outer end, said funnel-shaped sleeve forming a hook with which an additional cable may be engaged.

SWAYZE A. LYON.